(12) United States Patent
Shi et al.

(10) Patent No.: US 11,113,517 B2
(45) Date of Patent: Sep. 7, 2021

(54) OBJECT DETECTION AND SEGMENTATION FOR INKING APPLICATIONS

(71) Applicant: Microsoft Technology Licensing, LLC, Redmond, WA (US)

(72) Inventors: Yixin Shi, Redmond, WA (US); Aman Orazaev, Bellevue, WA (US); Tianyi Chen, Redmond, WA (US); Sheng Yi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 16/360,006

(22) Filed: Mar. 20, 2019

(65) Prior Publication Data
US 2020/0302163 A1   Sep. 24, 2020

(51) Int. Cl.
*G06K 9/00* (2006.01)
*G06T 7/11* (2017.01)
*G06N 3/04* (2006.01)

(52) U.S. Cl.
CPC ..... *G06K 9/00416* (2013.01); *G06K 9/00422* (2013.01); *G06N 3/04* (2013.01); *G06N 3/0418* (2013.01); *G06T 7/11* (2017.01)

(58) Field of Classification Search
CPC .. G06K 9/00416; G06K 9/00422; G06T 7/11; G06T 11/206; G06N 3/04; G06N 3/0418; G06F 3/04883; G06F 40/205
USPC .................................................. 382/173, 202
See application file for complete search history.

(56) References Cited

U.S. PATENT DOCUMENTS

2007/0140566 A1* 6/2007 Lin .................... G06K 9/00449
                                                              382/203

OTHER PUBLICATIONS

Avola, et al. (A machine Learning Approach for the online Separation of Handwriting from Freehand Drawing), Springer, pp. 223-232. (Year: 2017).*
Avola, et al. (A Novel Online Textual/Graphical Domain Separation Approach for Sketch-Based Interfaces), Springer, pp. 167-172. (Year: 2009).*
Bhat, et al. (Using Entropy to Distinguish Shape Versus Text in Hand-Drawn Diagrams), Springer, pp. 1395-1400 (Year: 2009).*
Chen, et al., "Convolutional Neural Networks for Page Segmentation of Historical Document Images", In Repository of arXiv:1704.01474, Apr. 5, 2017, 6 Pages.
Graves, Alex, "Offline Arabic Handwriting Recognition with Multidimensional Recurrent Neural Networks", In Book of Guide to OCR for Arabic Scripts, 2012, 16 Pages.
Oliveira, "dhSegment: A Generic Deep-Learning Approach for Document Segmentation", In Repository of arXiv:1804.1037, Apr. 27, 2018, 7 Pages.

(Continued)

*Primary Examiner* — Daniel G Mariam (57) ABSTRACT

An ink parsing system receives ink strokes at an inking device input and render the received ink strokes into an image in a pixel space. Writing strokes are detected in the image and labeled. Pixels corresponding to the labeled writing strokes are removed from the image. Drawing strokes in the image having the removed pixels are detected using and labeled. Writing objects and drawing objects corresponding, respectively, to the labeled writing strokes and the labeled drawing strokes are output. A digital ink parsing pipeline is thereby provided having accurate ink stroke detection and segmentation.

20 Claims, 10 Drawing Sheets

(56) References Cited

OTHER PUBLICATIONS

"International Search Report and Written Opinion Issued in PCT Application No. PCT/US2020/021831", dated Jul. 8, 2020, 16 Pages.
Plamondon, "Online and Off-line Handwriting Recognition: A Comprehensive Survey", In IEEE Transactions on Pattern Analysis and Machine Intelligence, vol. 22, Issue 1, Jan. 2000, pp. 63-84.
Vinciarelli, et al., "Combining Online and Offine Handwriting Recognition", In Proceedings of Seventh International Conference on Document Analysis and Recognition, Aug. 6, 2003, 5 Pages.
Wick, et al., "Fully Convolutional Neural Networks for Page Segmentation of Historical Document Image", In Repository of arXiv:1711.07695, Nov. 21, 2017, 6 Pages.

\* cited by examiner

OBJECT DETECTION AND SEGMENTATION FOR INKING APPLICATIONS

BACKGROUND

Digital inking tools allow users to create digital content such as diagrams, flowcharts, notes, etc. Recognizing the content created with digital ink can facilitate an increase in user productivity. To that end, handwriting recognition and stroke analysis are common digital inking functions in which an image or drawing is interpreted to extract specific classes of information, such as the presence and location of particular characters or shapes.

However, conventional handwriting recognition and stroke analysis has numerous limitations including being sensitive to the stroke order of input, such that variation is stroke ordering reduces recognition accuracy. Additionally, recognition is not accurate if the size of handwritten content is large. Grouping and classification is also performed using different neural networks that are trained separately such that combining the results does not produce an optimal end result.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for digital ink parsing comprises receiving ink strokes at an inking device input, rendering the received ink strokes into an image in a pixel space, and detecting writing strokes in the image and label the writing strokes. The computerized method further comprises removing pixels corresponding to the labeled writing strokes from the image and detecting drawing strokes in the image having the removed pixels and label the drawing strokes. The method additionally comprises outputting writing objects and drawing objects corresponding, respectively, to the labeled writing strokes and the labeled drawing strokes.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to perform detection and segmentation of user inputs, particularly digital inking inputs. Object detection and segmentation techniques are implemented in a pipeline of machine learning engines configured as a parsing pipeline. Using the configured parsing pipeline, the contents of inking inputs, such as diagrams, are accurately recognized.

In one example, a convolutional neural network architecture (e.g., U-net) is trained to segment writing strokes, followed by a convolutional neural network (e.g., You Look Only Once (Yolo)) that detects and classifies drawing objects. The conversion of the Yolo recognition result from the image space to the stroke space utilizes a boosting decision tree to provide accurate stroke mapping in some examples. The pipeline allows for improved grouping and classification of digital ink strokes into strokes that belong to shapes and strokes that belong to text. Moreover, the pipeline is more resilient to stroke order during recognition.

While described with reference in some examples to U-net and Yolo, aspects of the disclosure are operable with any other neural networks having the characteristics described herein to support the disclosed functionality.

The present disclosure thereby provides a pipeline having the capability to parse free-form ink drawing, such as multiple font size in one page and random stroke order drawings. As a result, an ink parsing engine is configured to perform digital ink analysis that allows for receiving a broad set of strokes, use a classification technique to segment the strokes into more fine grained domains (e.g., text, shapes, connectors, etc.), and run each subgroup through a simpler classification algorithm tuned for that domain. The ink parsing engine has reduced sensitivity to ink stroke ordering, enables text recognition with different ink font sizes, and is agnostic to different sampling methods of incoming ink stroke data. In this manner, when a processor is programmed to perform the operations described herein, the processor is used in an unconventional way, and allows for the more rapid and/or accurate recognition of different inputs created with digital ink. A more efficient parsing process is thereby provided that improves the user experience.

Various examples are implemented as a digital ink conversion background application programming interface (API) that can be called by a particular application to parse the inking input to identify the different types of ink stroke inputs. It should be noted that while examples described herein relate to inking applications, other applications, such as optical character recognition (OCR) applications, can also benefit from the ink parsing engine that advantageously leverages the separation of ink detection into different components.

Figure 1:
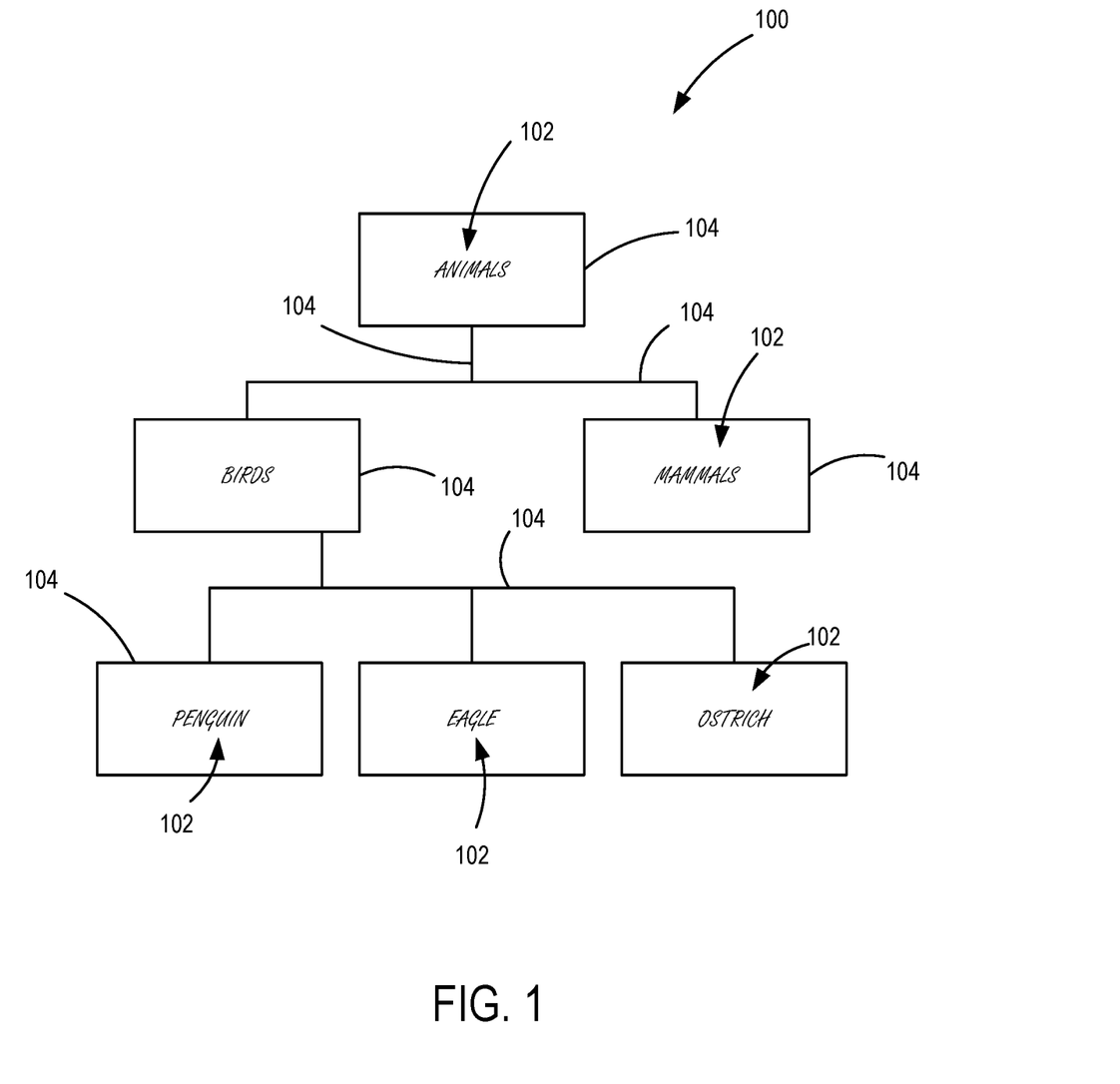
FIG. 1 is an inking input that can be parsed according to an embodiment.

FIG. 1 illustrates an inking input 100 that can be parsed according to various examples. The inking input includes writing inputs 102 that correspond to words in this example, and drawing inputs 104 that correspond to lines and boxes in this example. Pixel data represents the writing inputs 102 and the drawing inputs 104 in various examples, which correspond to inking strokes written by a human using a stylus. A parsing engine in one example is implemented as part of an inking application in which text written by a human using a stylus is converted into textual characters, and sketches drawn by a human using a stylus are converted into drawing objects by rendering all of the inking strokes into image (pixel) space. The output from various examples is also useful for further processing, for example in other applications operated upon by a computing device 1000, which is described in more detail in relation to FIG. 10.

Figure 2:
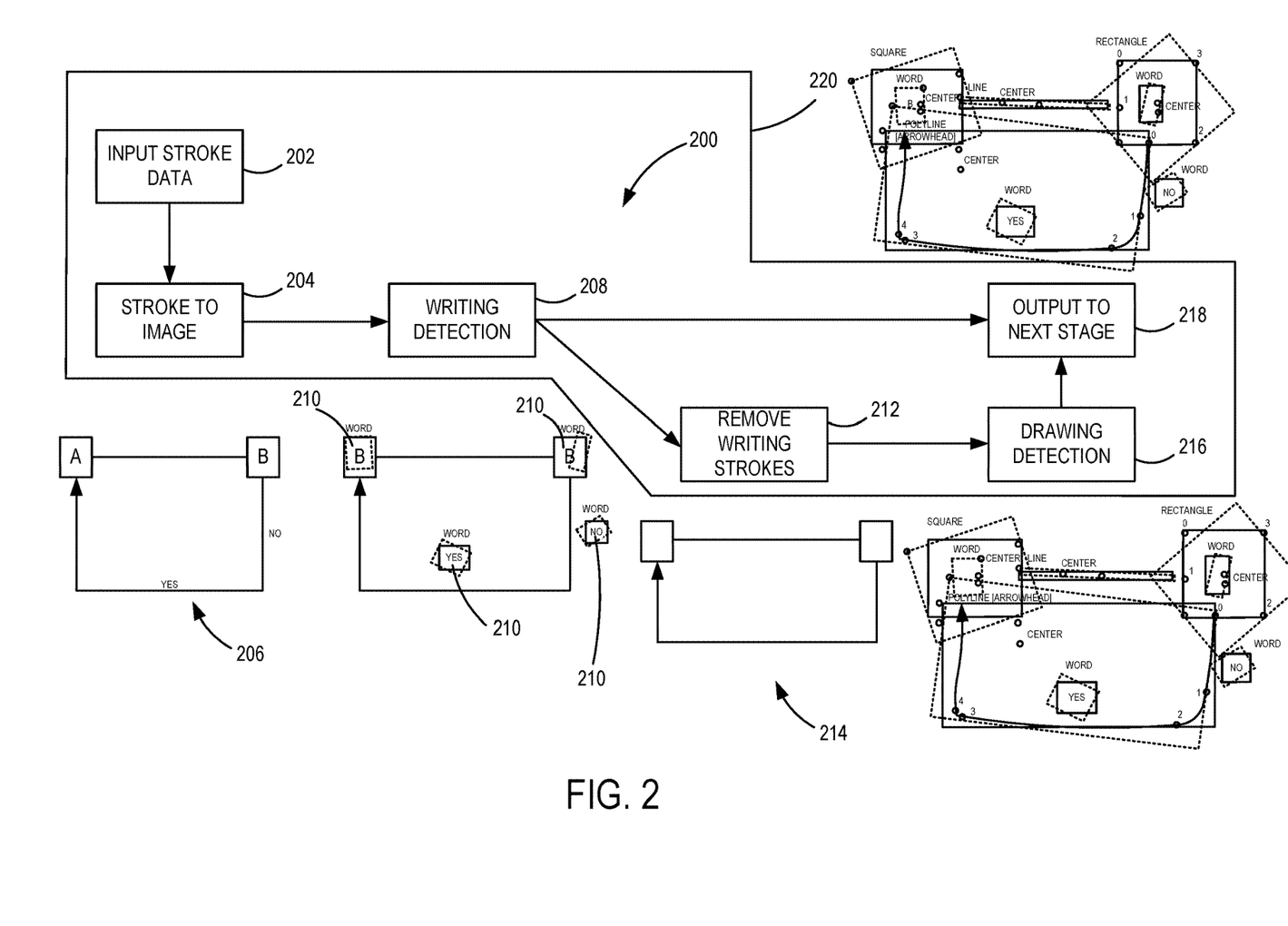
FIG. 2 is a block diagram of an ink parsing engine having a parsing pipeline according to an embodiment.

FIG. 2 illustrates an ink parsing engine 220 operable using a parsing pipeline 200 to parse inking inputs, such as the inking input 100. The components in the parsing pipeline 200 are arranged in the particular order shown to perform the parsing to separate the ink detection into different components that allow for more accurate detection and segments of inking inputs. That is, the order of operations can affect the accuracy of the computations. In the illustrated example, writing detection is performed before drawing detection to provide more accurate parsing for inking applications.

The parsing pipeline 200 receives input stroke data 202, such as the inking input 206 that includes different types of inputs, which are letters, boxes, and lines in the illustrated example. The inking strokes (e.g., letters, boxes, and lines) are converted to an image (e.g., converted into pixels in the image space) at 204.

Figure 3:
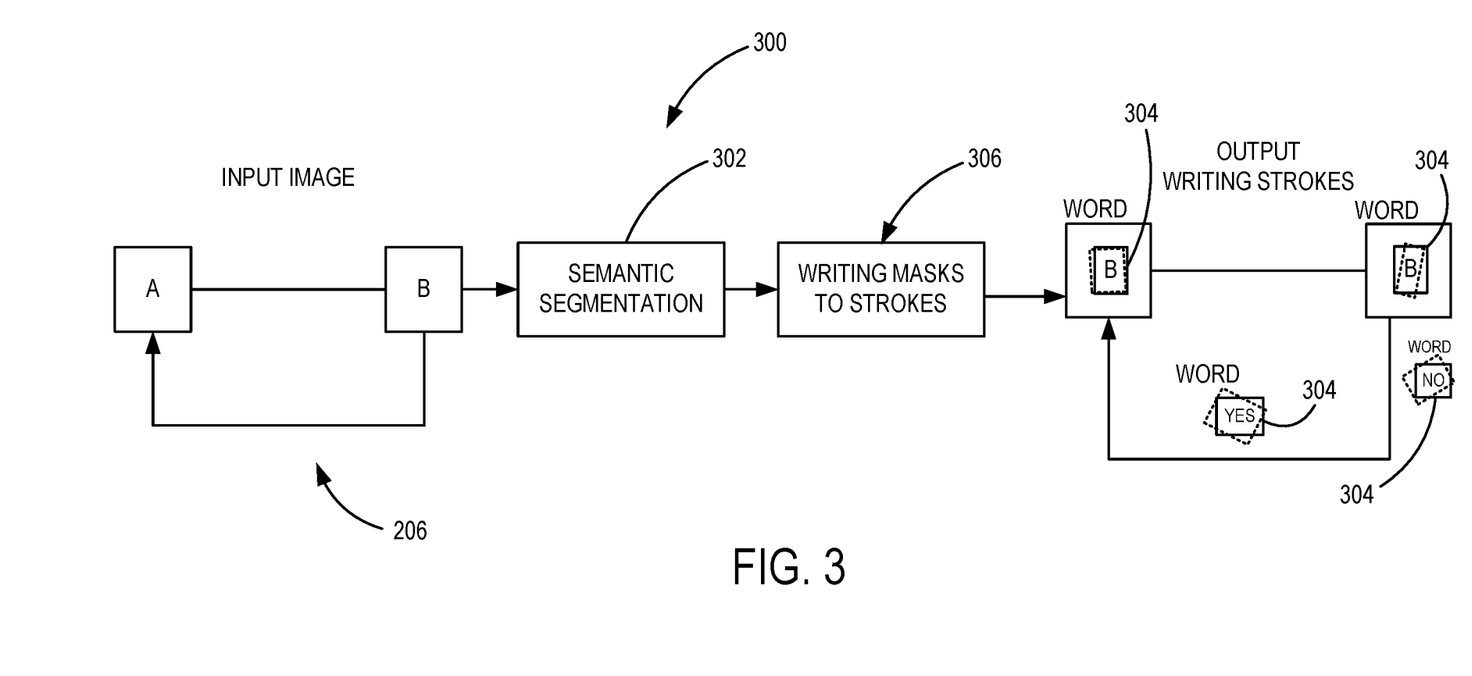
FIG. 3 is a block diagram of a writing detector according to an embodiment.

Writing detection is then performed on the converted inking strokes at 208. For example, word detection is performed to identify letters 210 within the image space (e.g., A, B, YES, and NO). For example, a writing detector component 300 is configured to perform word detection on the converted image strokes as illustrated in FIG. 3. As illustrated in this figure, the inking input 206 represents an inking input to a semantic segmentation process 302. In one example, the semantic segmentation process 302 performs semantic segmentation utilizing pixel-wise classification (e.g., writing or drawing pixel) to form a set of writing masks (regions) 304. The pixel-wise classification may be performed using various different techniques. In one example, the pixel-wise classification is performed using a customized U-net neural network configured for this pixel-wise classification. That is, a neural network is trained according to neural network techniques to perform pixel-wise classification.

Figure 4:
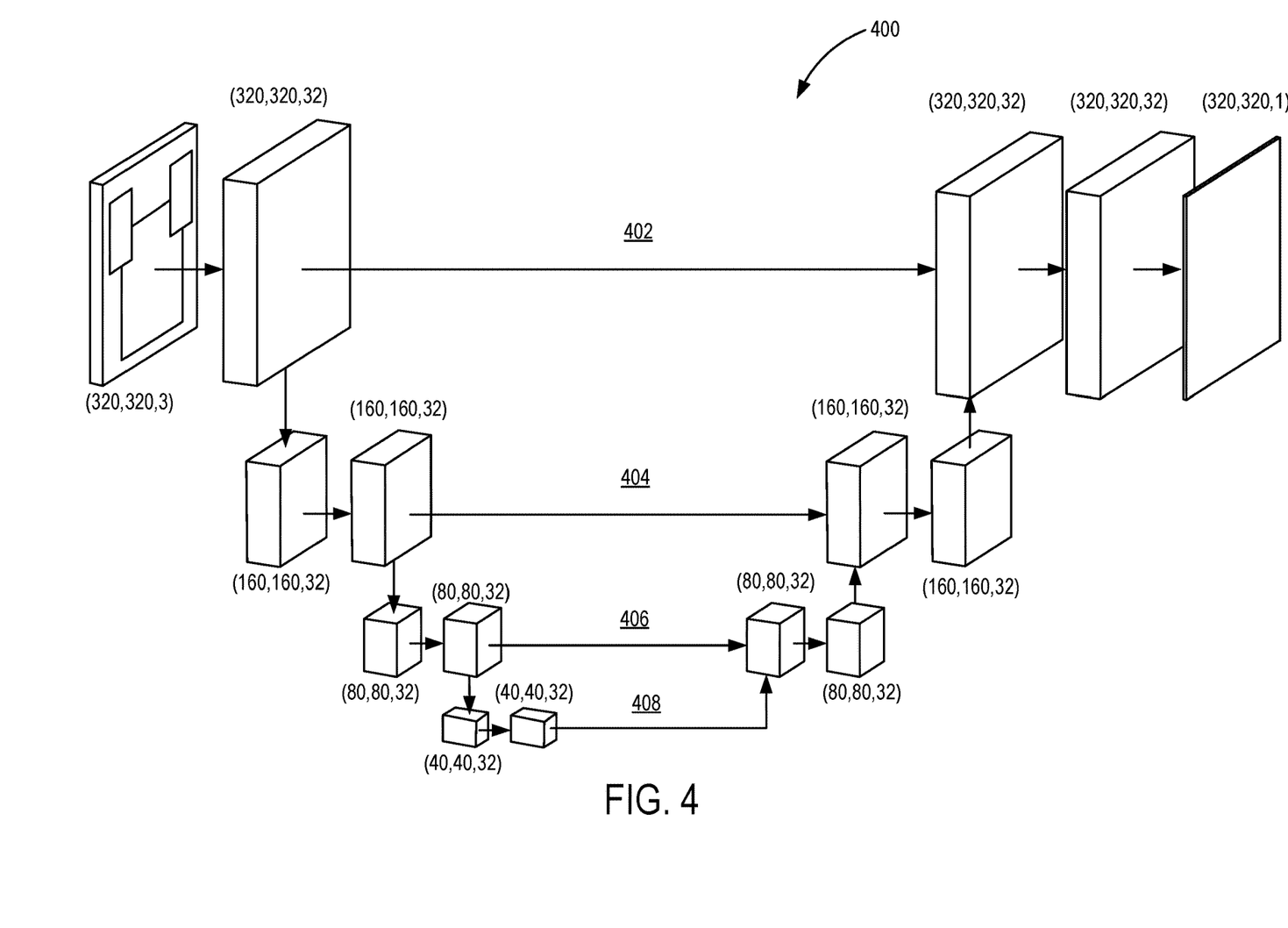
FIG. 4 illustrates a neural network according to an embodiment.

For example, as illustrated in FIG. 4, a customized U-net neural network 400 is utilized that is configured as a compressed U-net network. The customized U-net neural network 400 is configured to have a fixed number of kernels on each of the layers 402, 404, 406, and 408 (as indicated by the numbers in the parenthesis). In this configuration, the inherent connection operation of the customized U-net neural network 400 is changed from concatenation to addition, thereby providing gains on the inference time.

Referring again to FIG. 3, a labeling process 306 is configured to use the writing masks 304, which in some examples are predicted writing masks, to label the writing strokes. In the illustrated example, the writing strokes are labeled as a word type, which are letters. That is, the writing strokes are extracted from the writing masks 304. For example, given a set of writing mask $\{M_1, R_2, R_3, \ldots R_M\}$ and a set of strokes $\{S_1, S_2, S_3, \ldots, S_N\}$, the labeling process 306 determines the writing strokes, which are then labeled. One algorithm for performing this operation is:

1. for i=1, 2, ..., N.
2. Count the percentage of $S_i$ strokes points belonging to any writing mask, denote as $p_i$.
3. if $p_i \geq$ threshold.
4. Set $S_i$ as writing stroke.

Thus, the writing strokes of the inking input 206 are identified and labeled.

Returning to FIG. 2, the identified writing strokes are removed at 212. For example, as can be seen in the modified inking input 214, the letters 210 are removed. That is, the pixels in the image space corresponding to the identified letters 210 are removed from the inking input image.

Figure 5:
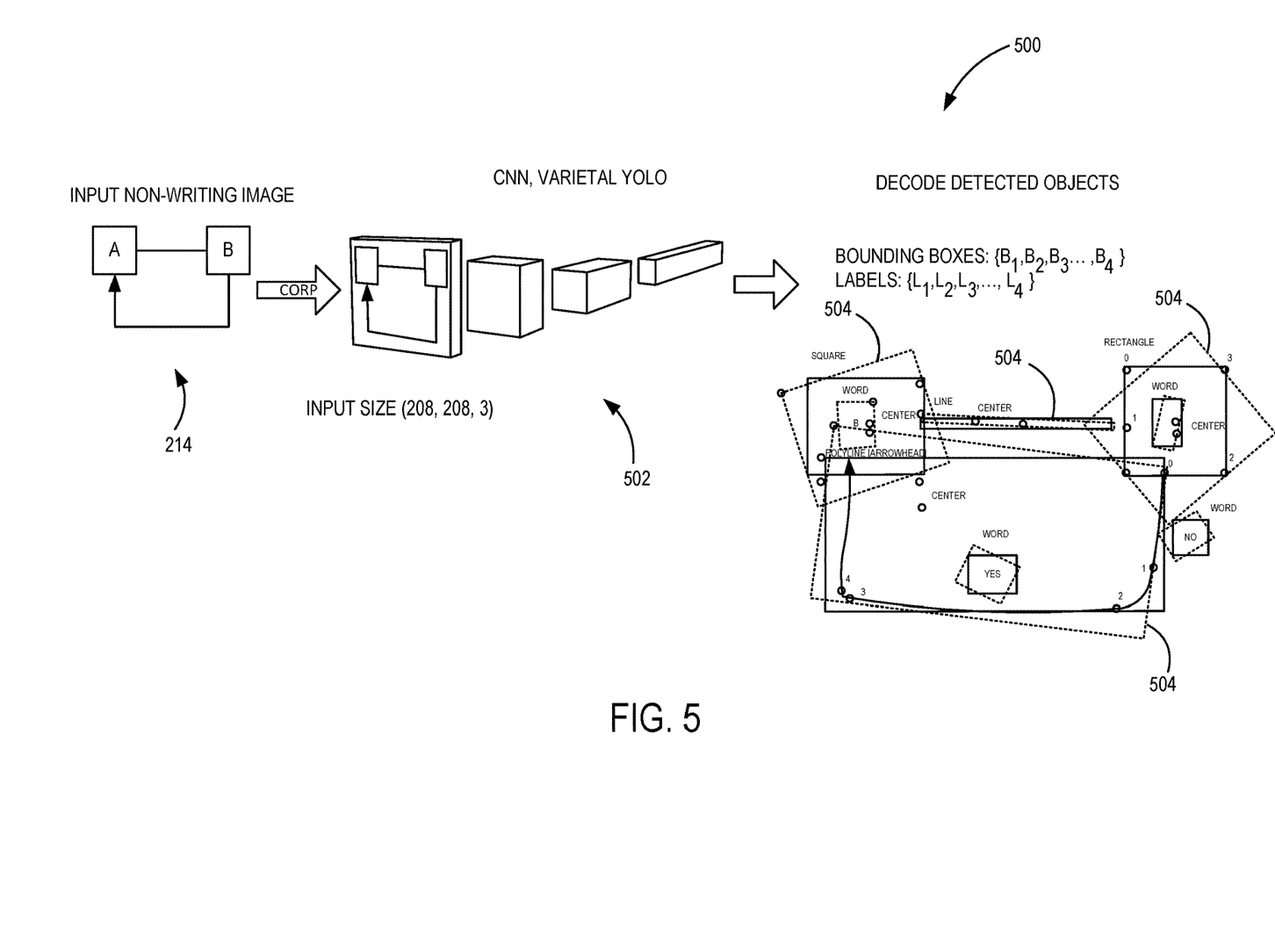
FIG. 5 illustrates a drawing detection process according to an embodiment.

Drawing detection 216 is then performed by a drawing detector component to identify drawing inputs corresponding to the inking strokes. For example, as illustrated in FIG. 5, a drawing detection process 500 is performed to identify inking strokes corresponding to drawings. More particularly, the modified inking input 214 represents a non-writing image that is input to a Convolutional Neural Network (CNN) 502 in some examples, which is illustrated as a Yolo convolutional network that detects and classifies drawing objects. For example, the CNN 502 is trained using neural network training techniques to decode detected objects using bounding boxes 504. The bounding boxes 504 facilitate the identification of the shaped objects, illustrated as a square, rectangle, line, and polyline (a line with an arrowhead). In one example, the bounding boxes 504 are assigned to define a grouping of pixels that are classified (e.g., using class labels) as objects. The bounding boxes 504 and class labels are assigned at the same time to all objects in the image. In some examples, the Yolo convolutional network operates using only a one-time forward pass, which is sufficient to obtain the prediction results. Accordingly, a faster detection process is performed. It should be noted that other CNNs can be implemented, such as based on the desired level of accuracy in the object detection.

In one example, the Yolo convolutional network is a modified Yolo convolutional network configured as a slim Yolo convolutional network. The slim Yolo convolutional network is implemented that is a combination of a full Yolo convolutional network and a tiny Yolo convolutional network. The full Yolo convolutional network achieves high accuracy, but is slow, and the tiny Yolo convolutional network is fast, but achieves lower accuracy. In one example, the slim Yolo convolutional network is a combination of the full Yolo convolutional network and the tiny Yolo convolutional network.

The drawing detection at 216 assigns bounding boxes 504 to strokes using different techniques. In one example, given a set of bounding boxes $\{B_1, B_2, B_3, \ldots, B_M\}$ with corresponding predicted labels $\{l_1, l_2, l_3, \ldots, l_M\}$, and a set of non-writing strokes $\{S_1, S_2, S_3, \ldots, S_N\}$, the drawing detection 216 determines to which bounding box 504 the current stroke belongs. One algorithm for performing this operation is:

1. for i=1, 2, ..., N.
2. for j=1, 2, ..., M.
3. Calculate numerical features $f=(f_1, f_2, f_3, \ldots, f_7)$ based on $S_i$ and $B_j$.
4. Input numerical features into a binary classifier to compute the probability of $S_i \in B_j$, denote as $p_{ij}$.
5. Assign bounding box $B_j^*$ to $S_i$ as the object that $S_i$ belongs to, such that $j^*=\text{argmax}(p_{i1}, p_{i2}, \ldots, p_{iM})$.

Figure 6:
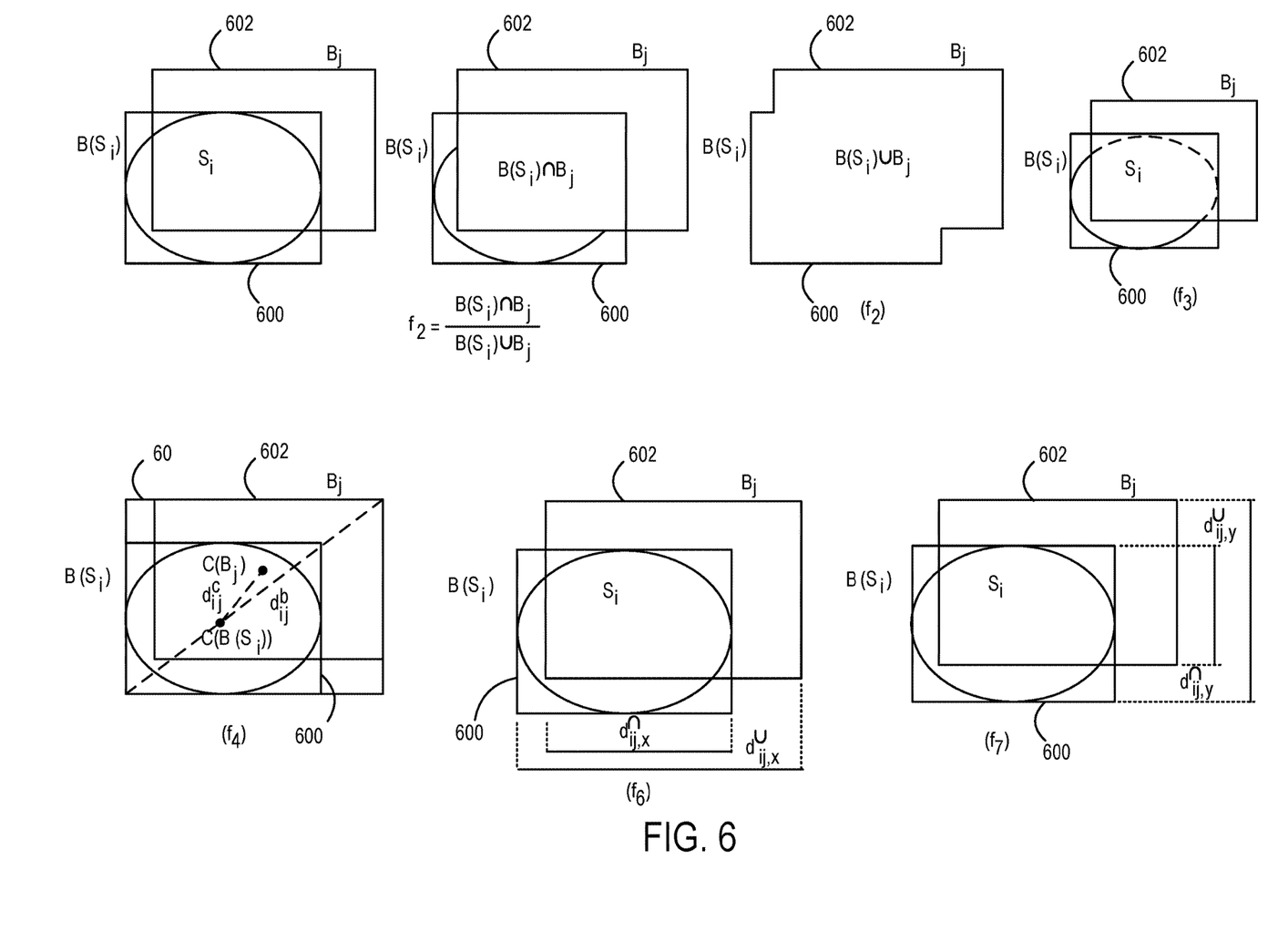
FIG. 6 illustrates bounding boxes used in a drawing detection process according to an embodiment.

More particularly, as illustrated in FIG. 6, the numerical features $f=(f_1, f_2, f_3, \ldots, f_7)$ based on $S_i$ 600 and $B_j$ 602 are calculated as follows:

1. $f_1$ as the label of $B_j$.
2. $f_2$ as the IOU (intersection over union) between $B_j$ and the bounding box for $S_i$, denoted as $B(S_i)$. That is, $$f_2 = \frac{B(S_i) \cap B_j}{B(S_i) \cup B_j}.$$

3. $f_3$ as the ratio of length of the part of $S_i$ in $B_j$, where $$f_3 = \frac{\text{length}(S_i \cap B_j)}{\text{length}(S_i)}.$$

4. $f_4$ as the distance between centers of $B(S_i)$ and $B_j$ over the diagonal of union rectangle 604, where $$f_4 = \frac{d_{ij}^c}{d_{ij}^b}.$$

5. $f_5$ as logarithm of aspect ratio of $B_j$ and $B(S_i)$, as follow:

$$f_5 = \frac{\min\{\log(a(B_j)), \log(a(B(S_i)))\}}{\max\{\log(a(B_j)), \log(a(B(S_i))), 10^{-7}\}}, \text{ where } a(B) = \frac{\text{width of } B}{\text{height of } B}.$$

6. $f_6$ as IOU on x-axis between $B_j$ and $B(S_i)$, where $$f_6 = \frac{d_{ij,x}^\cap}{d_{ij,x}^\cup}.$$

7. $f_7$ as IOU on y-axis between $B_j$ and $B(S_i)$, where $$f_7 = \frac{d_{ij,y}^\cap}{d_{ij,y}^\cup}.$$

With the drawing strokes detected and the writing strokes having been previously detected, this output 218 is provided to the next stage (e.g., for further processing). It should be appreciated that the output from the writing detection performed at 208 is also provided as part of the output 218 to the next stage.

Figure 7:
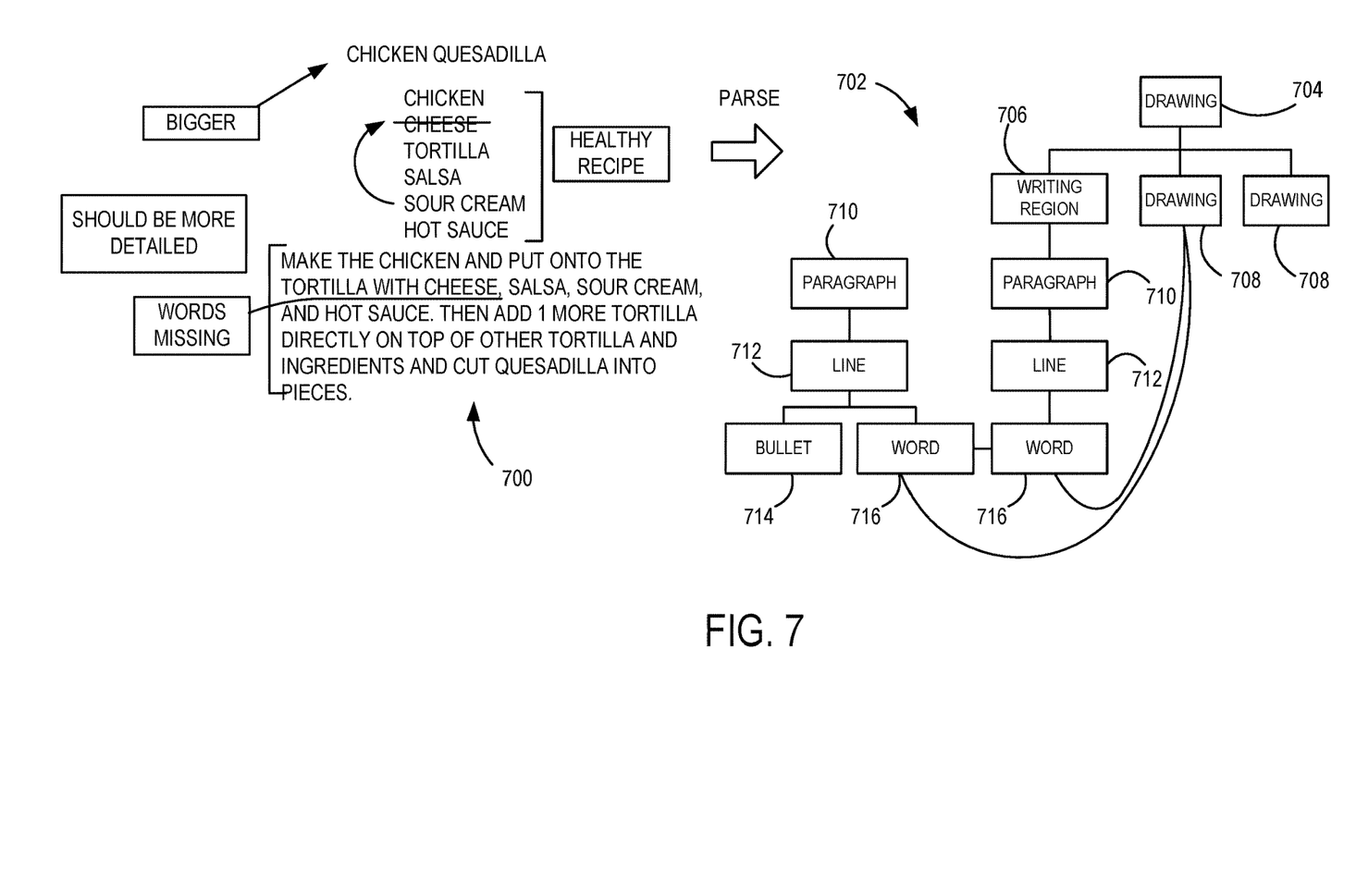
FIG. 7 illustrates parsing using a parsing tree according to an embodiment.

Thus, inking strokes 700 are parsed using a parsing tree 702 as illustrated in FIG. 7, which can be a selected decision tree. The parsing tree 702 corresponds to one example of the parsing performed by the parsing pipeline 200 (shown in FIG. 2). In this example, the inking strokes 700 include different writing and drawing strokes that correspond to a recipe. The parsing tree 702 illustrates that from a root 704 (e.g., image in pixel space of rendered image strokes) a writing region 706 and drawings 708 are detected, which can correspond to the writing detection and drawing detection as described herein. Using, for example, a semantic segmentation as described herein, the writing strokes are identified and labeled as paragraphs 710, with lines 712, bullets 714, and words 716. The labeled writing strokes are then removed from the pixel space and drawing detection performed to identify and label the drawings 708 as described herein. Thus, the parsing tree 702 allows for efficient and accurate detection and labeling of writing strokes and drawing strokes by separating the ink detection into different components. The parsing pipeline can be used to retain and change a neural network that performs inking conversion according to the present disclosure.

Thus, digital ink strokes are rendered as an image that is input to a writing detector that identifies and label writing strokes, which are then removed from the image in the pixel space and input to a drawing detector. The drawing detector then identifies and labels the drawing strokes. Thereafter, labeled writing objects and labeled drawing objects are output by various examples, such as by the parsing pipeline.

Figure 8:
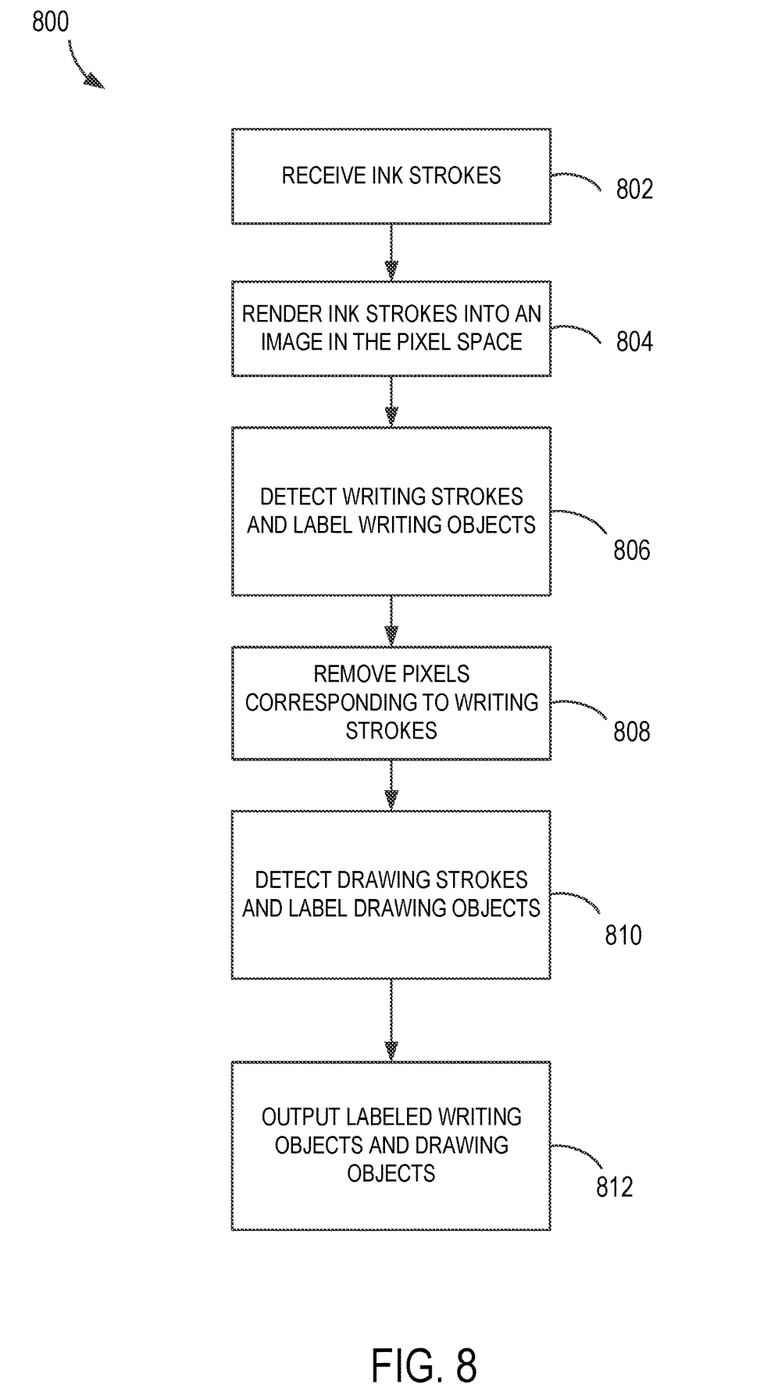
FIG. 8 is a flowchart of a process for detection and segmentation for an inking environment according to an embodiment.

FIG. 8 is a flowchart 800 illustrating exemplary operations involved in detection and segmentation for inking and other applications. In some examples, the operations described for flowchart 800 are performed by a computing device 1000 of FIG. 10. The flowchart 800 commences at operation 802 with receiving ink strokes. For example, a user inputs text and drawings on a touchscreen device using an inking application. The input device can be any inking device capable of generating an inking input to an inking application. It should be appreciated that the operations performed by the flowchart 800 can be applied to non-inking applications.

Operation 804 includes rendering the ink strokes into an image in the pixel space. In some example, the ink strokes are rendered to image pixel data, wherein the pixel data represents handwriting. That is, the ink strokes are rendered into an image in the pixel space in various examples. The ink strokes can now be processed using image detection and segmentation techniques.

Operation 806 includes detecting writing strokes and labeling the detected writing strokes as writing objects. For example, the image pixels corresponding to the writing objects are labeled to identify letters corresponding to the ink strokes. The pixels corresponding to the labeled writing objects are then removed from the image at operation 808. For example, all the pixels corresponding to the identified letters are removed from the image.

Operation 810 includes detecting drawing strokes in the image having the pixels corresponding to the labeled writing object removed, and labeling the drawing strokes. For example, the image pixels corresponding to the drawing objects are labeled to identify lines or shapes corresponding to the ink strokes. The pixels corresponding to the lines and shapes are labeled accordingly.

The labeled writing objects and drawings objects are output at operation 812, such as for further processing. For example, the segmented and identified labeled writing objects and drawings objects are input to perform additional inking operations.

Figure 9:
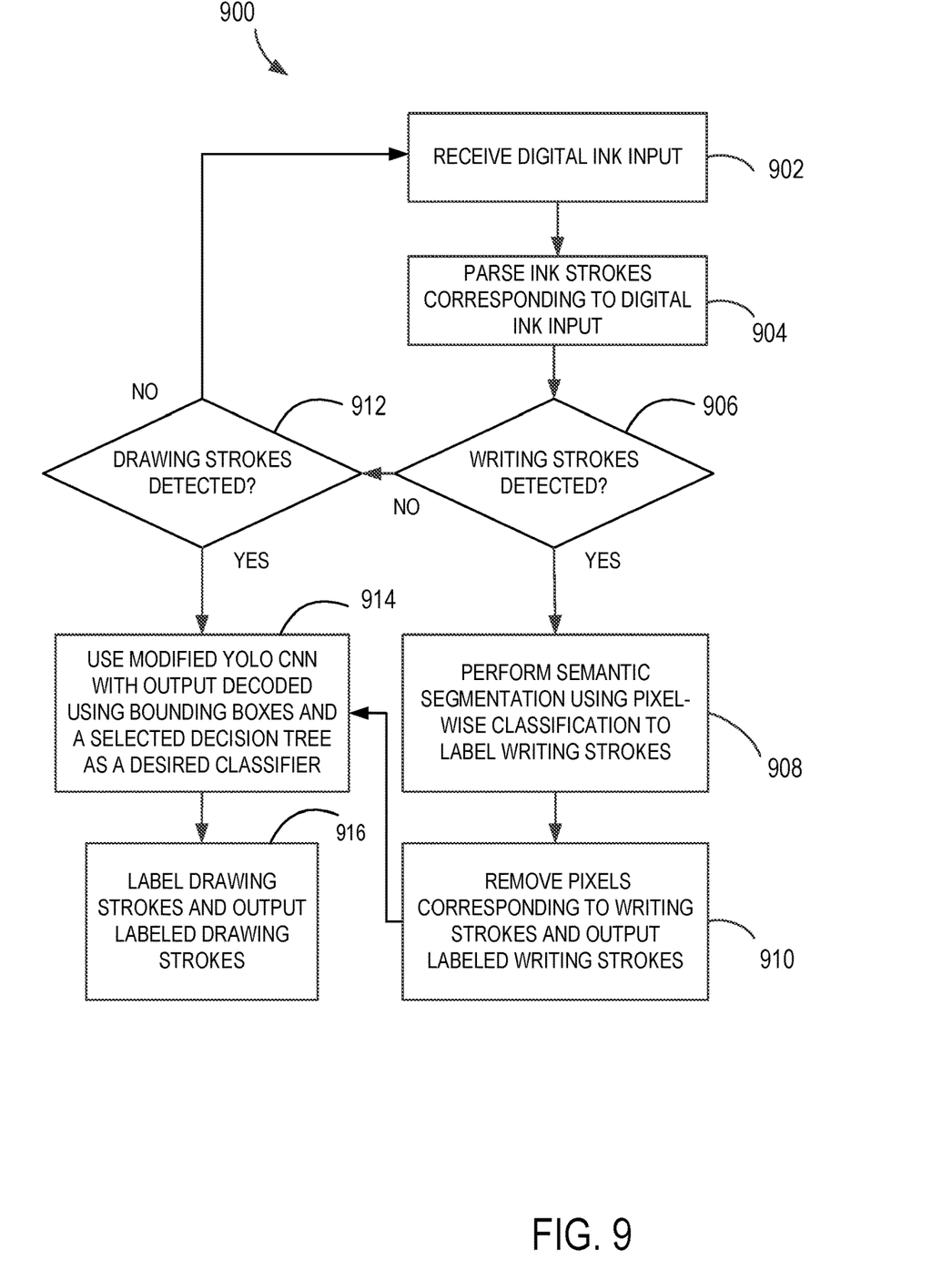
FIG. 9 is another flowchart of a process for detection and segmentation for an inking environment according to an embodiment.

FIG. 9 is a flowchart 900 illustrating exemplary operations involved in detection and segmentation for inking and other applications. In some examples, the operations described for flowchart 900 are performed by the computing device 1000 of FIG. 10. The flowchart 900 commences in operation 902 with receiving a digital ink input. For example, digital ink inputs are received at a digital ink input device.

Ink strokes corresponding to the digital ink input are parsed at operation 904. For example, using a parsing tree, writing regions and drawing regions are identified and that are separately subjected to ink stroke type detection. In various examples, the writing regions are processed first and then the drawing regions are processed. To that end, at operation 906 a determination is made whether writing strokes are detected. If writing strokes are detected, then at operation 908, semantic segmentation using pixel-wise classification is performed to label the writing strokes. In one example, a customized U-net neural network is used. With this technique, predicted writing masks are used to label the writing strokes.

At operation 910, the image pixel corresponding to the labeled writing strokes are removed and output, for example, as writing stroke objects. The writing stroke objects are used in next stage processing in some examples.

If writing strokes are not detected at operation 906, then a determination is made whether drawing strokes are detected at operation 912. If no drawing strokes are detected, the operations are again commenced at operation 902. If drawing strokes are detected (of after the pixels have been removed at operation 910), then at operation 914 a modified Yolo CNN is used with the output decoded using bounding boxes and a selected decision tree as a desired classifier. For example, as described herein, a plurality of numerical features are calculated based on non-writing strokes and corresponding bounding boxes. This results in identifying the drawing strokes, which are labeled and output as labeled drawing strokes at 916.

Thus, various examples include an ink parsing engine that is configured to perform image-based processing for diagramming processing. For writing semantic segmentation classification, a compressed variant of U-net neural network is used in some examples. For drawing detection, an object detection technique with a configuration having a compressed variant of Yolo to reduce computation cost is used in some examples. For drawing object to stroke conversion, a decision tree is constructed that specifies designed features to be analyzed in some examples.

Additional Examples

Some aspects and examples disclosed herein are directed to an ink parsing system comprising: a memory associated with a computing device, the memory including a writing detector component and a drawing detector component; and a processor that executes an ink parsing engine having a parsing pipeline that uses the writing detector component and the drawing detector component to: receive ink strokes at an inking device input; render the received ink strokes into an image in a pixel space; detect writing strokes in the image using the writing detector component and label the writing strokes; remove pixels corresponding to the labeled writing strokes from the image; detect drawing strokes in the image having the removed pixels using the drawing detector component, and label the drawing strokes; and output writing objects and drawing objects corresponding, respectively, to the labeled writing strokes and the labeled drawing strokes.

Additional aspects and examples disclosed herein are directed to a computerized method for digital ink parsing comprising: receiving ink strokes at an inking device input; rendering the received ink strokes into an image in a pixel space; detecting writing strokes in the image and label the writing strokes; removing pixels corresponding to the labeled writing strokes from the image; detecting drawing strokes in the image having the removed pixels and label the drawing strokes; and outputting writing objects and drawing objects corresponding, respectively, to the labeled writing strokes and the labeled drawing strokes.

Additional aspects and examples disclosed herein are directed to one or more computer storage media having computer-executable instructions for digital ink parsing that, upon execution by a processor, cause the processor to at least: receive ink strokes at an inking device input; render the received ink strokes into an image in a pixel space; detect writing strokes in the image and label the writing strokes; remove pixels corresponding to the labeled writing strokes from the image; detect drawing strokes in the image having the removed pixels and label the drawing strokes; and output writing objects and drawing objects corresponding, respectively, to the labeled writing strokes and the labeled drawing strokes.

Alternatively, or in addition to the other examples described herein, examples include any combination of the following:

performing a semantic segmentation using pixel-wise classification to detect the writing strokes;

using predicted writing masks to label the writing strokes;

using a U-net neural network having a plurality of layers, each with a fixed number of kernels, to perform the semantic segmentation;

performing drawing stroke detection using a You Look Only Once (Yolo) convolutional network;

decoding detected drawing strokes using a plurality of bounding boxes with corresponding predicted labels, and using a decision tree as a binary classifier to detect the drawing strokes; and While the aspects of the disclosure have been described in terms of various examples with their associated operations, a person skilled in the art would appreciate that a combination of operations from any number of different examples is also within scope of the aspects of the disclosure.

Example Operating Environment

Figure 10:
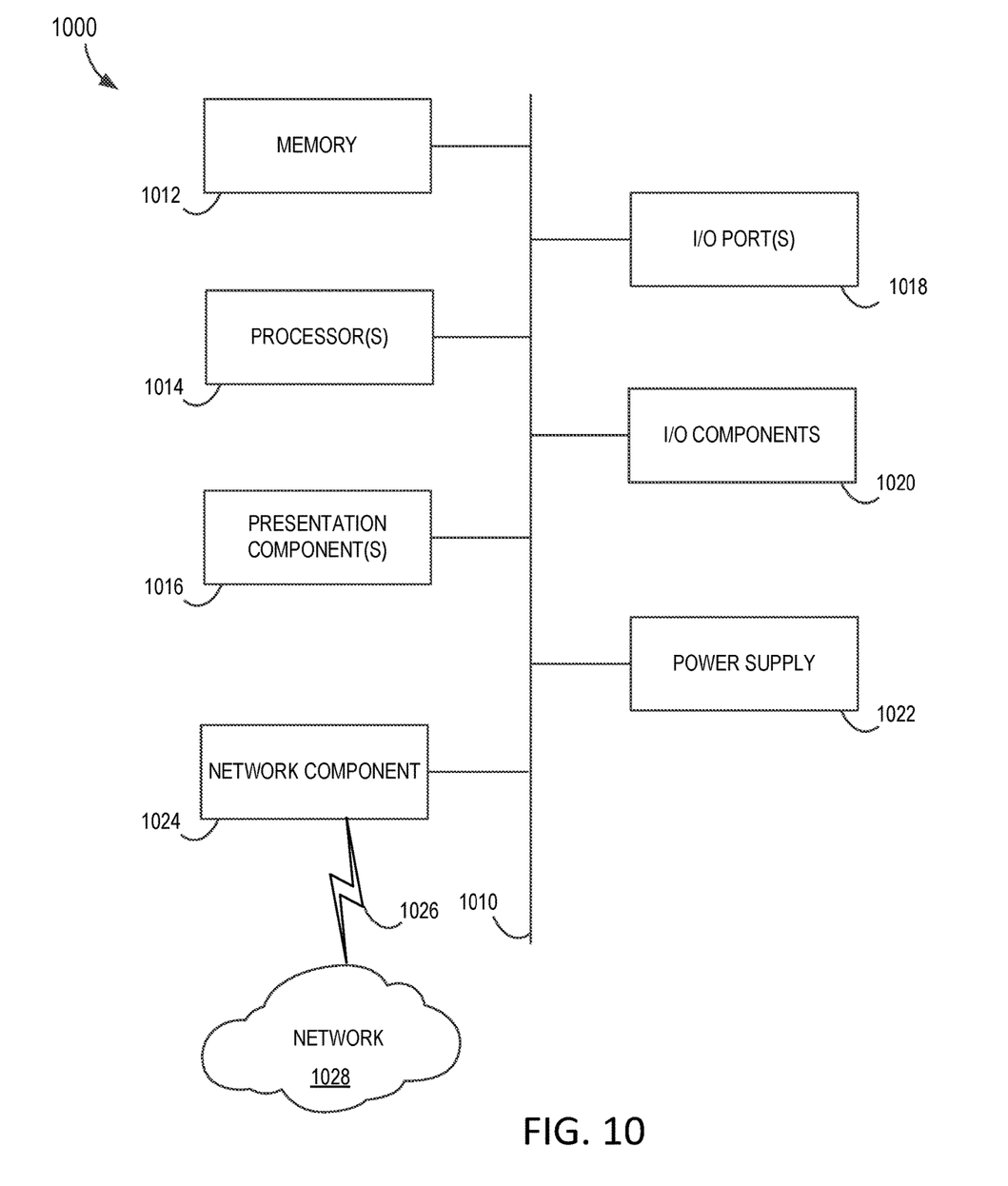
FIG. 10 is a block diagram of an example computing environment suitable for implementing some of the various examples disclosed herein.

FIG. 10 is a block diagram of an example computing device 1000 for implementing aspects disclosed herein, and is designated generally as computing device 1000. The computing device 1000 is but one example of a suitable computing environment and is not intended to suggest any limitation as to the scope of use or functionality of the examples disclosed herein. Neither should the computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

The computing device 1000 includes a bus 1010 that directly or indirectly couples the following devices: a computer-storage memory 1012, one or more processors 1014, one or more presentation components 1016, input/output (I/O) ports 1018, I/O components 1020, a power supply 1022, and a network component 1024. While the computer device 1000 is depicted as a seemingly single device, multiple computing devices 1000 may work together and share the depicted device resources. For instance, the computer-storage memory 1012 may be distributed across multiple devices, processor(s) 1014 may provide housed on different devices, and so on.

The bus 1010 represents what may be one or more busses (such as an address bus, data bus, or a combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 10 is merely illustrative of an exemplary computing device that can be used in connection with one or more disclosed examples. Distinction is not made between such categories as "workstation," "server," "laptop," "hand-held device," etc., as all are contemplated within the scope of FIG. 10 and the references herein to a "computing device." The computer-storage memory 1012 may take the form of the computer-storage media references below and operatively provide storage of computer-readable instructions, data structures, program modules and other data for the computing device 1000. For example, the computer-storage memory 1012 may store an operating system, a universal application platform, or other program modules and program data. The computer-storage memory 1012 may be used to store and access instructions configured to carry out the various operations disclosed herein.

As mentioned below, the computer-storage memory 1012 may include computer-storage media in the form of volatile and/or nonvolatile memory, removable or non-removable memory, data disks in virtual environments, or a combination thereof. And the computer-storage memory 1012 may include any quantity of memory associated with or accessible by the computing device 1000. The memory 1012 may be internal to the computing device 1000 (as shown in FIG. 10), external to the computing device 1000 (not shown), or both (not shown). Examples of the memory 1012 include, without limitation, random access memory (RAM); read only memory (ROM); electronically erasable programmable read only memory (EEPROM); flash memory or other memory technologies; compact disk read-only memory (CD-ROM), digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 1000. Additionally, or alternatively, the computer-storage memory 1012 may be distributed across multiple computing devices 1000, e.g., in a virtualized environment in which instruction processing is carried out on multiple devices 1000. For the purposes of this disclosure, "computer storage media," "computer-storage memory," "memory," and "memory devices" are synonymous terms for the computer-storage memory 1012, and none of these terms include carrier waves or propagating signaling.

The processor(s) 1014 may include any quantity of processing units that read data from various entities, such as the memory 1012 or I/O components 1020. Specifically, the processor(s) 1014 are programmed to execute computer-executable instructions for implementing aspects of the disclosure. The instructions may be performed by the processor, by multiple processors within the computing device 1000, or by a processor external to the client computing device 1000. In some examples, the processor(s) 1014 are programmed to execute instructions such as those illustrated in the flow charts discussed below and depicted in the accompanying drawings. Moreover, in some examples, the processor(s) 1014 represent an implementation of analog techniques to perform the operations described herein. For example, the operations may be performed by an analog client computing device 1000 and/or a digital client computing device 1000. Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. Ports 1018 allow computing device 1000 to be logically coupled to other devices including I/O components 1020, some of which may be built in. Examples I/O components 1020 include, for example but without limitation, a microphone, joystick, game pad, satellite dish, scanner, printer, wireless device, etc.

The computing device 1000 may operate in a networked environment via the network component 1024 using logical connections to one or more remote computers. In some examples, the network component 1024 includes a network interface card and/or computer-executable instructions (e.g., a driver) for operating the network interface card. Communication between the computing device 1000 and other devices may occur using any protocol or mechanism over any wired or wireless connection. In some examples, the network component 1024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. For example, network component 1024 communicates over a communication link 1026 with a network 1028.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of RAM, ROM, EEPROM, flash memory or other memory technology, CD-ROM, DVD or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Any range or device value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for digital ink parsing. The illustrated one or more processors 1014 together with the computer program code stored in memory 1012 constitute exemplary processing means for using and/or training neural networks.

The term "comprising" is used in this specification to mean including the feature(s) or act(s) followed thereafter, without excluding the presence of one or more additional features or acts.

In some examples, the operations illustrated in the figures can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An ink parsing system comprising:
   a memory associated with a computing device, the memory including a writing detector component and a drawing detector component; and
   at least one processor that executes an ink parsing engine that uses the writing detector component and the drawing detector component to:
   receive ink strokes at an inking device input;
   render the received ink strokes into an image;
   detect one or more writing strokes in the image using the writing detector component and label the writing strokes;
   remove one or more pixels corresponding to the labeled writing strokes from the image;
   detect one or more drawing strokes in the image, after detecting the one or more writing strokes and removing the one or more pixels corresponding to the labeled writing strokes using the drawing detector component, and label the drawing strokes; and
   output one or more writing objects and one or more drawing objects corresponding, respectively, to the labeled writing strokes and the labeled drawing strokes.

2. The ink parsing system of claim 1, wherein the at least one processor executes the ink parsing engine to perform a semantic segmentation with the writing detector component, the semantic segmentation using pixel-wise classification to detect the writing strokes.

3. The ink parsing system of claim 2, wherein the at least one processor executes the ink parsing engine to use predicted writing masks to label the writing strokes.

4. The ink parsing system of claim 2, wherein the at least one processor executes the ink parsing engine to use a neural network having a plurality of layers, each with a fixed number of kernels, to perform the semantic segmentation.

5. The ink parsing system of claim 1, wherein the at least one processor executes the ink parsing engine to perform drawing stroke detection with the drawing detector component using a convolutional network.

6. The ink parsing system of claim 5, wherein the at least one processor executes the ink parsing engine to decode detected drawing strokes using a plurality of bounding boxes with corresponding predicted labels, and further uses a decision tree as a binary classifier to detect the drawing strokes.

7. The ink parsing system of claim 1, wherein (i) the ink parsing engine has a parsing pipeline configured to perform detection using the writing detector component before performing detection using the drawing detector component, (ii) the writing detector is configured to remove the one or more pixels to generate a modified inking input, (iii) the drawing detector component is configured to perform detection of the one or more drawing strokes on the modified inking input that, comprises a non-writing image, and (iv) the modified inking input, the one or more writing objects, and the one or more drawing objects are output to a next stage for processing.

8. A computerized method for digital ink parsing, the computerized method comprising:
  receiving ink strokes at an inking device input;
  rendering the received ink strokes into an image;
  detecting one or more writing strokes in the image and label the writing strokes;
  removing one or more pixels corresponding to the labeled writing strokes from the image;
  detecting one or more drawing strokes in the image, after detecting the one or more writing strokes and removing the one or more pixels corresponding to the labeled writing strokes, and label the drawing strokes; and
  outputting one or more writing objects and one or more drawing objects corresponding, respectively, to the labeled writing strokes and the labeled drawing strokes.

9. The computerized method of claim 8, further comprising performing a semantic segmentation using pixel-wise classification to detect the writing strokes.

10. The computerized method of claim 9, further comprising using predicted writing masks to label the writing strokes.

11. The computerized method of claim 9, further comprising using a neural network having a plurality of layers, each with a fixed number of kernels, to perform the semantic segmentation.

12. The computerized method of claim 8, further comprising performing drawing stroke detection using a convolutional network.

13. The computerized method of claim 12, further comprising decoding detected drawing strokes using a plurality of bounding boxes with corresponding predicted labels, and using a decision tree as a binary classifier to detect the drawing strokes.

14. The computerized method of claim 8, further comprising using a parsing pipeline that is configured to detect writing strokes before detecting drawing strokes.

15. One or more computer storage media having computer-executable instructions for digital ink parsing that, upon execution by at least one processor, cause the at least one processor to at least:
  receive ink strokes at an inking device input;
  render the received ink strokes into an image;
  detect one or more writing strokes in the image and label the writing strokes;
  remove one or more pixels corresponding to the labeled writing strokes from the image;
  detect one or more drawing strokes in the image, after detecting the one or more writing strokes and removing the one or more pixels corresponding to the labeled writing strokes, and label the drawing strokes; and
  output one or more writing objects and one or more drawing objects corresponding, respectively, to the labeled writing strokes and the labeled drawing strokes.

16. The one or more computer storage media of claim 15 having further computer-executable instructions that, upon execution by the at least one processor, cause the at least processor to at least perform a semantic segmentation using pixel-wise classification to detect the writing strokes.

17. The one or more computer storage media of claim 16 having further computer-executable instructions that, upon execution by the at least one processor, cause the at least processor to at least use predicted writing masks to label the writing strokes.

18. The one or more computer storage media of claim 16 having further computer-executable instructions that, upon execution by the at least one processor, cause the at least processor to at least use a neural network having a plurality of layers, each with a fixed number of kernels, to perform the semantic segmentation.

19. The one or more computer storage media of claim 15 having further computer-executable instructions that, upon execution by the at least one processor, cause the at least processor to at least perform drawing stroke detection using a convolutional network, decode detected drawing strokes using a plurality of bounding boxes with corresponding predicted labels, and use a decision tree as a binary classifier to detect the drawing strokes.

20. The one or more computer storage media of claim 15 having further computer-executable instructions that, upon execution by the at least processor, cause the at least processor to at least use a parsing pipeline that is configured to detect writing strokes before detecting drawing strokes.

* * * * *